(12) United States Patent
Harral et al.

(10) Patent No.: US 7,181,739 B1
(45) Date of Patent: Feb. 20, 2007

(54) INSTALLATION RELATIONSHIP DATABASE

(75) Inventors: Adam L. Harral, Highland, UT (US); Greg Richardson, Alpine, UT (US)

(73) Assignee: Novell, Inc., Provo, UT (US)

( * ) Notice: Subject to any disclaimer, the term of this patent is extended or adjusted under 35 U.S.C. 154(b) by 678 days.

(21) Appl. No.: 10/387,523

(22) Filed: Mar. 14, 2003

(51) Int. Cl.
*G06F 9/445* (2006.01)
*G06F 9/44* (2006.01)

(52) U.S. Cl. .................. 717/176; 717/170; 717/175

(58) Field of Classification Search ........ 717/174–177, 717/168–171; 707/1, 200–203; 709/203
See application file for complete search history.

(56) References Cited

U.S. PATENT DOCUMENTS

| | | | |
|---|---|---|---|
| 5,739,765 A | 4/1998 | Stanfield et al. | 340/825.49 |
| 5,751,221 A | 5/1998 | Stanfield et al. | 340/5.74 |
| 5,835,911 A * | 11/1998 | Nakagawa et al. | 707/203 |
| 5,991,774 A * | 11/1999 | Tate et al. | 707/203 |
| 6,026,380 A | 2/2000 | Weiler et al. | 705/34 |
| 6,209,031 B1 | 3/2001 | Casey et al. | 709/222 |
| 6,289,512 B1 | 9/2001 | Edwards et al. | 717/178 |
| 6,301,708 B1 | 10/2001 | Gazdik et al. | 717/175 |
| 6,347,397 B1 | 2/2002 | Curtis | 717/170 |
| 6,360,365 B1 | 3/2002 | Curtis | 717/169 |
| 6,367,075 B1 | 4/2002 | Kruger et al. | 717/169 |
| 6,370,686 B1 * | 4/2002 | Delo et al. | 717/174 |
| 6,378,127 B1 * | 4/2002 | Delo | 717/174 |
| 6,418,554 B1 * | 7/2002 | Delo et al. | 717/174 |
| 6,490,722 B1 * | 12/2002 | Barton et al. | 717/174 |
| 6,591,418 B2 * | 7/2003 | Bryan et al. | 717/177 |
| 6,675,382 B1 * | 1/2004 | Foster | 717/177 |
| 6,735,768 B1 * | 5/2004 | Tanaka | 717/174 |
| 6,813,765 B1 * | 11/2004 | Flores | 717/174 |
| 6,874,143 B1 * | 3/2005 | Murray et al. | 717/173 |
| 6,920,631 B2 * | 7/2005 | Delo | 717/174 |
| 6,968,550 B2 * | 11/2005 | Branson et al. | 717/168 |
| 6,973,647 B2 * | 12/2005 | Crudele et al. | 717/177 |
| 7,051,319 B1 * | 5/2006 | Thorson et al. | 717/122 |

(Continued)

OTHER PUBLICATIONS

Anzbock et al, "Software configuration distribution and deployment of web services", ACM SEKE, pp. 649-656, 2002.*

(Continued)

*Primary Examiner*—Anil Khatri
(74) *Attorney, Agent, or Firm*—Pillsbury Winthrop Shaw Pittman, LLP

(57) ABSTRACT

A method and system for administering software product installation, removal and updating on a computer network according to a versioning database, including loading a software distribution set into a versioning database, the software distribution set comprising a software product having a plurality of files for operating the software product on a computer. Loading includes loading a first entity identifying the software distribution set into the versioning database, determining whether an identity of each of the plurality of files is currently identified as an entity currently provided on the versioning database, loading a plurality of second entities each corresponding to a respective file of the plurality of files, wherein only those files of the plurality of files determined not to be identified as an entity currently provided on the versioning database are loaded as second entities. The method and system further include storing the plurality of files, linking the first entity with the plurality of second entities, targeting a workstation in communication with the computer network for installation of the software product corresponding to the software distribution set and installing the software product on the targeted workstation.

20 Claims, 13 Drawing Sheets

U.S. PATENT DOCUMENTS 7,055,149 B2 * 5/2006 Birkholz et al. ............ 717/172
7,062,676 B2 * 6/2006 Shinohara et al. ............ 714/15

OTHER PUBLICATIONS

Green, "Component based software development implication for documentation", ACM pp. 159-164.*

Hall et al, "A cooperative approach to support software deployment using the software dock", ACM ICSE, pp. 174-183.*

Dolstra et al, "Imposing a memeory management discipline on software deployment", IEEE ICSE, pp. 1-10, 2004.*

* cited by examiner

INSTALLATION RELATIONSHIP DATABASE

FIELD OF THE INVENTION

The invention is related to a method and system for tracking electronic files and more particularly to computer software for tracking and managing relationships of files during installation and removal of a computer system.

BACKGROUND OF THE INVENTION

Often, when installing a new software product on a computer system, new versions of particular files which are included in the installation of the new product overwrite or replace older versions of the same files and used by existing products previously installed on the computer. Generally, this does not cause a problem. However, if the new software product is uninstalled from the computer system, the newer version files are often times removed from the computer system. This results in the impairment or inoperability of any software that rely on the removed files.

In addition, even if the new software product is not removed, existing software on the computer system which operated with a previous version of a file updated by the installation of the new software product may not operate correctly. Upon such an occurrence, the older software product may need to be reinstalled so that a copy of the older version of the affected file may be found. However, if the older version is reinstalled on the system, the new software product may not operate with the older version of the problem file.

Accordingly, most software products were designed to operate with versions of supporting files which shipped with the product. Thus, when newer versions of files replace older versions of files in new product installation, problems may occur with the existing software products such that these existing software products may remain unusable.

Thus, there exists the need for tracking files such that proper versions are installed with their corresponding software product, removed when no longer needed and also made available for reinstallation/restoration upon a problem when their base program is executed.

SUMMARY OF THE INVENTION

The invention sets forth a method and system to maintain a Versioning Database, a database model for managing all software products, file groups and files for a computer network. Using this database, correct files and file versions may be installed and removed to workstations on the network according to the particular software products and systems to which they relate.

To that end, the invention also includes embodiments which use the Versioning Database to validate files on workstations to insure that the proper files and versions of the files for particular software products are installed.

In one embodiment of the invention, the Versioning System/Database may be operated from a server, for example (or any networked computer), which may be an Administration Server on a local area network (LAN) that may also manage software product installs and uninstalls for the LAN. Accordingly, a Network Administrator who manages a LAN, may use a network installer program in combination with the Versioning System/Database (or a part of) to install, remove and validate software products and files on each workstation of the LAN. New workstations may be synchronized with the Versioning System/Database as well so that the files associated with software products installed thereon may be validated and corrected if necessary.

In some embodiments of the invention, the Versioning System/Database preferably establishes a node for each software product, associated software product files, file groups, files and directories (together "entities"). Each node may also include a relationship (e.g., link) to another node, where the entities which correspond to the nodes are related. This allows the management of multiple versions of the same file and/or software product. Thus, the Versioning System/Database may process relational expressions related to any entity so that the proper files are installed to an removed from a computer.

Each node of the Versioning Database may also include other information about the entity. A file source locator/link (and/or relationship) may be associated with a node to reference the file source (archive location or otherwise) of the entity on the computer network (or external to the network). Such a location may include a Uniform Resource Locator (URL).

A location may also include a location to a Software Distribution Sets (SDS) associated with a software product entity of the node. An SDS may be a file group for a particular software product, which may be represented in the Versioning System/Database as a node as well. In some embodiments of the invention, the SDS is a directory located on the network, for example, with the associated files being stored therein.

Each node may also include a usage flag for the associated entity that indicates if the entity is active on the LAN, and/or a usage count that indicates the number of workstations and/or servers which are currently using the entity, and may also include the name of the workstation/server(s) using the entity.

In some embodiments of the invention, the Versioning System/Database SDSs may be authenticated. Specifically, the Versioning System/Database may insure that each file of an SDS is the proper file for the SDS, by referring to the corresponding nodes for that SDS in the Versioning Database. This authentication aids in ruling out any tampering/replacement of the files of an SDS. Validating the SDS may also be conducted on an individual workstation/server which utilizes the associated software product of the SDS.

Various embodiments of the invention thus allow for uninstalls to be "surgically" performed. That is, the specific files associated with a software product may be removed, set aside or otherwise disabled according to the relationships indicated in the Versioning Database. With such uninstalls, the Versioning Database allows for the restoration of files previously removed or disabled from a computer when the uninstalled software product was first installed.

Accordingly, in one embodiment of the invention, a method for coordinating entities for a computer system includes loading an entity on a computer system, providing a first node in an installation relationship database for representing a first entity, determining a relationship between the entity of the first node and a second entity of a second node and associating the determined relationship between the first entity and the second entity with the first node and/or the second node.

In another embodiment of the invention, a method for installing a software product on a workstation computer of a computer network, the network including one or more workstation computers in communication with a server for controlling installation and removal of software products on the network, the method includes loading a software product on the server, wherein the software product includes a plurality of files associated with a software distribution set for the software product, storing each file in a location accessible by the network, establishing a plurality of new nodes in an installation relational database corresponding to each of the plurality of files, wherein each new node includes a reference to the stored location of the corresponding file, linking one or more new nodes with a related current nodes of the installation relationship database, targeting a first workstation for installing the software product, establishing one or more first nodes for one or more first workstation files that are earlier versions of one or more of the plurality of files of the software product, copying the one or more workstation files to a system first workstation software distribution set for restoration purposes and installing each file of the plurality of files on the first workstation which are not currently stored on the first workstation or which later versions of corresponding files currently stored on the first workstation.

In the above embodiment, each related current node may include a reference/relationship to the stored location of the file corresponding to the related new node, and a new node may be established on the database for the software product itself.

The above embodiment may also include uninstalling the software product from the first workstation, which includes removing the first files from the first workstation and copying the one or more first workstation files from the first system software distribution set to the first workstation.

In another embodiment of the invention, a system for performing a method for installing a software product on a workstation computer of a computer network, the network including one or more workstation computers in communication with a server for controlling installation and removal of software products on the network, includes loading means for loading a software product on the server, where the software product includes a plurality of files associated with a software distribution set for the software product, storing means for storing each file in a location accessible by the network, establishing means for establishing a plurality of new nodes in an installation relational database corresponding to each of the plurality of files, where each new node includes a reference to the stored location of the corresponding file, linking means for linking one or more new nodes with a related current nodes of the installation relationship database, targeting means for targeting a first workstation for installing the software product, establishing means for establishing one or more first nodes for one or more first workstation files that are earlier versions of one or more of the plurality of files of the software product, copying means for copying the one or more workstation files to a system first workstation software distribution set for restoration purposes and installing means for installing each file of the plurality of files on the first workstation which are not currently stored on the first workstation or which later versions of corresponding files currently stored on the first workstation.

In yet another embodiment of the invention, a system for performing a method for coordinating entities for a computer system includes loading means for loading an entity on a computer system, providing means for providing a first node in an installation relationship database for representing a first entity, determining means for determining a relationship between the entity of the first node and a second entity of a second node and associating means for associating the determined relationship between the first entity and the second entity with the first node and/or the second node.

In each of the system embodiments listed above, the respective means may be carried out by a computer system and associated peripheral equipment. Specifically, a computer processor operating according to computer instructions for carrying out the methods of the embodiments of the invention may operate as each means listed above.

In still yet another embodiment of the invention, a computer system includes a Versioning Database comprising a plurality of nodes each corresponding to an entity, wherein related nodes are relationally linked and a software distribution set for a software product, the software distribution set including one or more files for operating the software product, wherein the Versioning Database includes a node corresponding to the software product relationally linked to each node for each of the files for operating the software product, and wherein the nodes for the files for operating the software product are relationally linked to nodes corresponding to other versions of such files.

The invention may also includes computer readable media for performing one or more of the methods outlined in the above embodiments. The invention may further also include a computer application program for enabling a computer system to perform one or more of the methods.

These aspects and advantages of the invention will become even more clearer with reference to the drawings, a brief description of which is set out below, and detailed description which follows.

BRIEF DESCRIPTION OF THE DRAWINGS

FIG. 4 illustrates a state of the Versioning Database and Target System prior to software product being loaded thereon.

FIG. 5 illustrates a state of the Versioning Database and Target System after a first software product has been loaded on the Versioning Database and prior to the first software product being installed on the Target System.

FIG. 6 illustrates a state of the Versioning Database and Target System after the first software product has been installed on the Target System.

FIG. 7 illustrates a state of the Versioning Database and Target System after a second software product has been loaded on the Versioning Database and prior to the second software product being installed on the Target System.

FIG. 8 illustrates a state of the Versioning Database and Target System after the second software product has been installed on the Target System.

FIG. 9 illustrates a state of the Versioning Database and Target System after a third software product has been loaded on the Versioning Database and prior to the third software product being installed on the Target System.

FIG. 10 illustrates a state of the Versioning Database and Target System after the third software product has been installed on the Target System.

FIG. 11 illustrates a state of the Versioning Database and Target System after the second software product has been uninstalled from the Target System.

DETAILED DESCRIPTION OF THE PREFERRED EMBODIMENTS

The invention sets forth a novel method and system of a Versioning Database that maintains software products, file groups and files from Software Distribution Sets (SDS) ("entities") that have been loaded onto, for example, an Administration Server of a local-area-network. Using this database, correct files and file versions may be installed and removed to/from workstations on the network according to the particular software products and systems to which they relate.

One of skill in the art will appreciate that although the invention is described herein with reference to a computer network, various embodiments of the invention may be applied to any computing platform (networked and non-networked) including one or more personal computers (PCs), personal digital assistants (PDAs) or other microprocessor/software based products.

Figure 12:
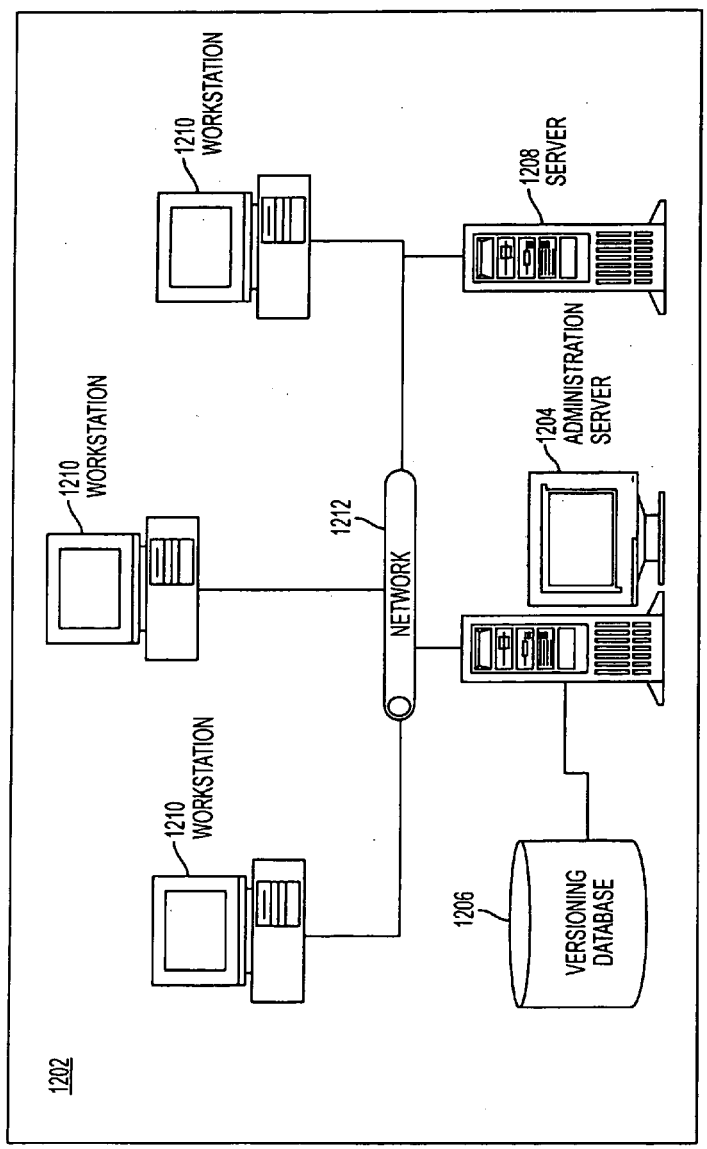
FIG. 12 illustrates an exemplary local-area-network for which embodiments of the invention may be carried out.

Accordingly, various embodiments of the invention may be used with any computer system including personal computers, workstations, mainframe computers, servers, and the like, provided on, for example, a network 1202. One embodiment of the invention operates in a networked environment where workstations 1210 communicate with a Local Area Network (LAN) 1212 as illustrated in FIG. 12. The LAN may also include other devices including an Administration server 1204, and Versioning Database 1206, and network server (e.g., a file server) 1208, for handling (for example) storage of SDSs, applications, and other uses. Such a network may be linked together via wired and wireless technologies and may include connections to larger wide-area-networks (WAN) and other computing networks including the internet.

Using the Administration Server, for example, a Network Administrator can monitor, manage and maintain the workstations and the software for the network. Thus, a Versioning System/Database according to the invention may be installed, operated and accessed on the Administration Server (or any computer which may manage the network). The Network Administrator may catalog all available software products of the network, including those located on one or more workstations and network servers and log them into the Versioning System/Database according to various embodiments of the invention.

In embodiments of the invention, each entity is uniquely identifiable in the Versioning Database and may be represented as a node thereof. The node may include one or more references to information, including for example, a destination, a name and/or a version, etc., of an associated entity. Additionally, each node may also be linked to one or more nodes corresponding to entities to which they relate (related nodes). Other information referenced by the nodes may include usage count(s)/flag(s), which generally indicate where the entity is presently being used (e.g. workstations, servers, and the like), the location (e.g., drive, directory) of the entity on a workstation and/or the location of the entity in an archive location (e.g., SDS). Thus, if the file needed to be replaced, removed or updated, it could be located throughout the network and quickly dispensed with.

As stated, nodes (and the entities they represent) may be linked to a number of other related nodes (and the entities they represent) in the database. These other entities may be any associated item for the operation of the particular software product. Generally, these entities are the files that may be necessary to operate the software product on a computer.

Nodes may also include or otherwise reference an acceptance criteria associated/related to its corresponding entity. For example, an entity may be associated with acceptance criteria which only enables the entity to be installed on a computer having a certain amount of memory, hard drive space, processor type and/or speed, display, video card, sound board, motherboard, bus-speed, operating system, software product(s) and the like. In some embodiments, the acceptance criteria may also be based on rights (access or otherwise) of a user of a particular workstation.

Nodes may also refer/relate to type specific information. For example, for a file entity, a file size, creation and/or modification date and other information (e.g., CRC) may be maintained. For a software product entity, a source URL may also be maintained.

Although each entity is associated with a node in the Versioning Database, a node need not refer to an entity (e.g., an associated file). In some embodiments of the invention, a node may be created which includes no associated entity, but is related to other nodes which do include an associated entity. This arrangement may be used to remove an entity, related to that node, from a workstation when an uninstall of a software product occurs.

An SDS for a software product may be loaded on the Versioning System/Database with a minimal amount of data. An SDS may be a container (e.g., object, directory) which contain files for installing on a workstation, which are required for operating a particular software product. The SDS may be stored on the local system, on the intranet, or across the WEB. Using the Versioning Database, each file of the SDS may be compared to the files associated with the various nodes. If the SDS includes files which are already referred to by the database, these files need not need to be stored on the system again. Thus, some nodes/files may be referenced by multiple SDSs at the same time.

In some embodiments of the invention, the nodes of the Versioning Database may include a relational link to a node representing its corresponding SDS. Not only does this allow for the proper files to be installed to a Target System for each software product, but allows the Versioning System/Database to verify that the proper files for the software product were installed on the Target System. This may be done periodically to insure that the files for the workstation have not been tampered with by a user of a Target System who may have installed a software product locally at the Target System which replaced files of a network installed software product during the local install. For example, the Versioning System may scan a workstation and find a product installed thereon, but is missing a later version of a related file. Thus, the Versioning System may install the later version file on the SDS to correct the disparity.

A System SDS represents a container for base files which have been removed from a Target System upon the installation of a software product having associate entities (i.e. files) that are more recent than files that were on the system and which also do not exist in any other known SDS. Whenever an SDS references an object which has never been tracked in the database before, the system identifies the original file and copies it to a system SDS. This is done so that if all software products on a Target System were uninstalled, the original file(s) could be restored. Accordingly, in some embodiments of the invention, a version for the file may be placed in the database, designating it as the original version.

Figure 3:
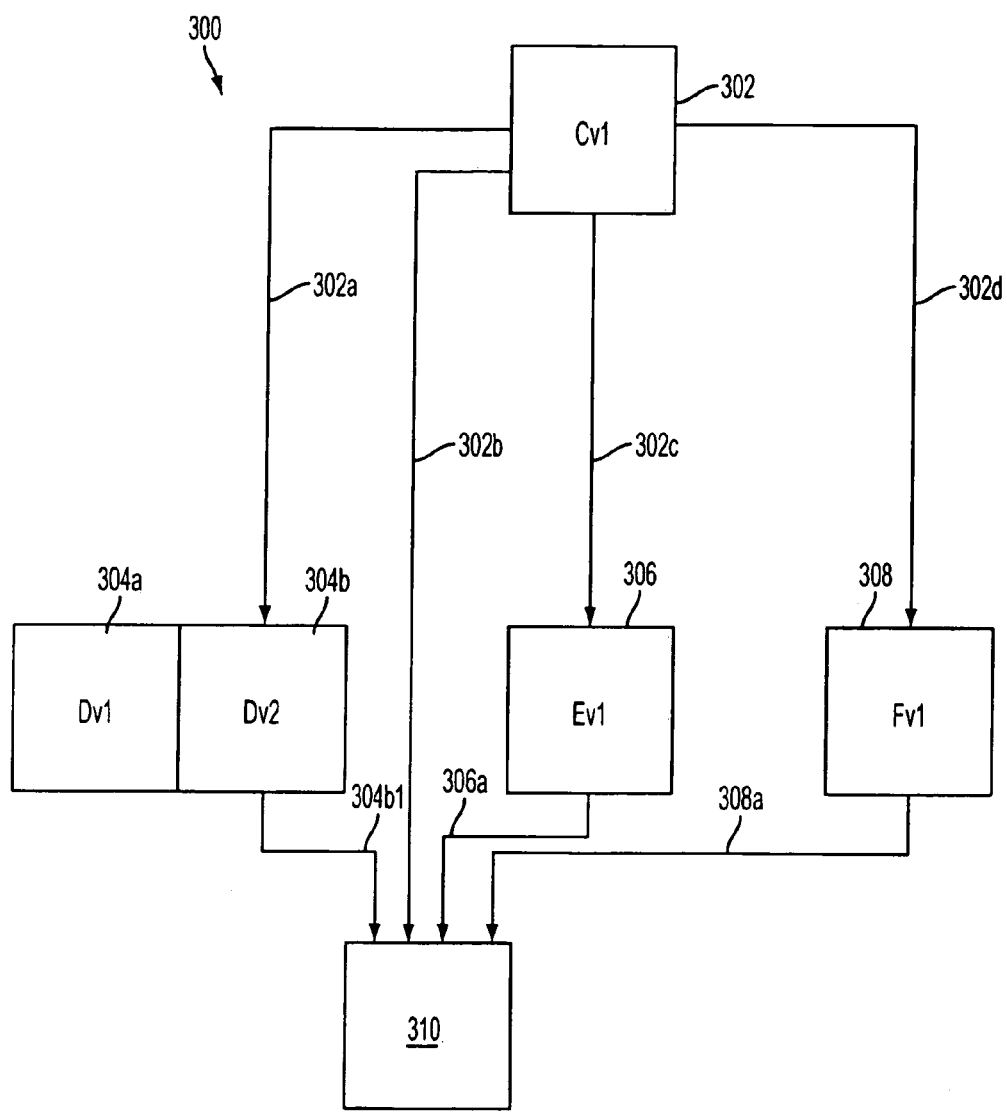
FIG. 3 illustrates an overview of the nodes of the Versioning Database according to one embodiment of the invention.

FIG. 3 illustrates a high level overview of relations between nodes of the Versioning Database 300 according to an embodiment of the invention. A particular software product "C" includes one or more files that are used in its operation, namely, "D," "E," and "F." In terms of their respective versions, software product C is a first version (referred to herein as "Cv1") and uses a second version of file D (referred to herein as "Dv2"), a first version of file E (referred to herein as "Ev1"), and a first version of file F (referred to herein as "Fv1"). According to the invention, Versioning Database 300 represents software product C as a node 302, file Dv2 as a node 304b, file Ev1 as a node 306, and file Fv1 as a node 308. Relationships among the nodes reflect the corresponding relationships among the entities (i.e., files) they represent. These relationships among the nodes are illustrated as by arrows 302a, 302c and 302d, respectively.

As illustrated in FIG. 3, node 304b is directly related to a node 304a. This reflects the existence of another version of file D (in this instance an earlier version "Dv1") managed by Versioning Database, although not used or otherwise a part of software product Cv1. The direct relationship is represented by the adjacent positioning of node 304a to 304b.

The Versioning Database also identifies a relationship between the software product and a corresponding SDS for the software product, which is represented as a node 310 Node 310 may include references/relations to files Dv2, Ev1 and Fv1 (and/or their corresponding nodes in the database), as well as the manifest and signature for the software product. The relationship between software product node 302 and node 310 is indicated by arrow 302b. The SDS, which may be stored apart from the Versioning Database, may be a directory containing files Dv2, Ev1 and Fv1, as well as a manifest and signature of the software product Cv1.

Installation and un-installation of software products and files tracked by the Versioning Database for a network may be accomplished by a Network Administrator from, for example, the Administration Server. In some embodiments of the invention, the Versioning System/Database includes an installer/un-installer application (or is used in conjunction with a separate installer/un-installer application). Thus, when a Network Administrator designates a target computer workstation system to install a software product thereon, files may be moved from registered archival locations (e.g., an SDS) to the Target System in accordance with the relations specified in the Versioning Database.

Configuration scripts, which are scripts for installing a software product on a workstation, may be easily designed to take advantage of the Versioning Database and insure that the proper files and file versions are installed to Target Systems. For example, a configuration script which allows for multiple SDSs (including multiple SDS components) to be loaded into a target computer system is easily accommodated in the invention.

Figure 1:
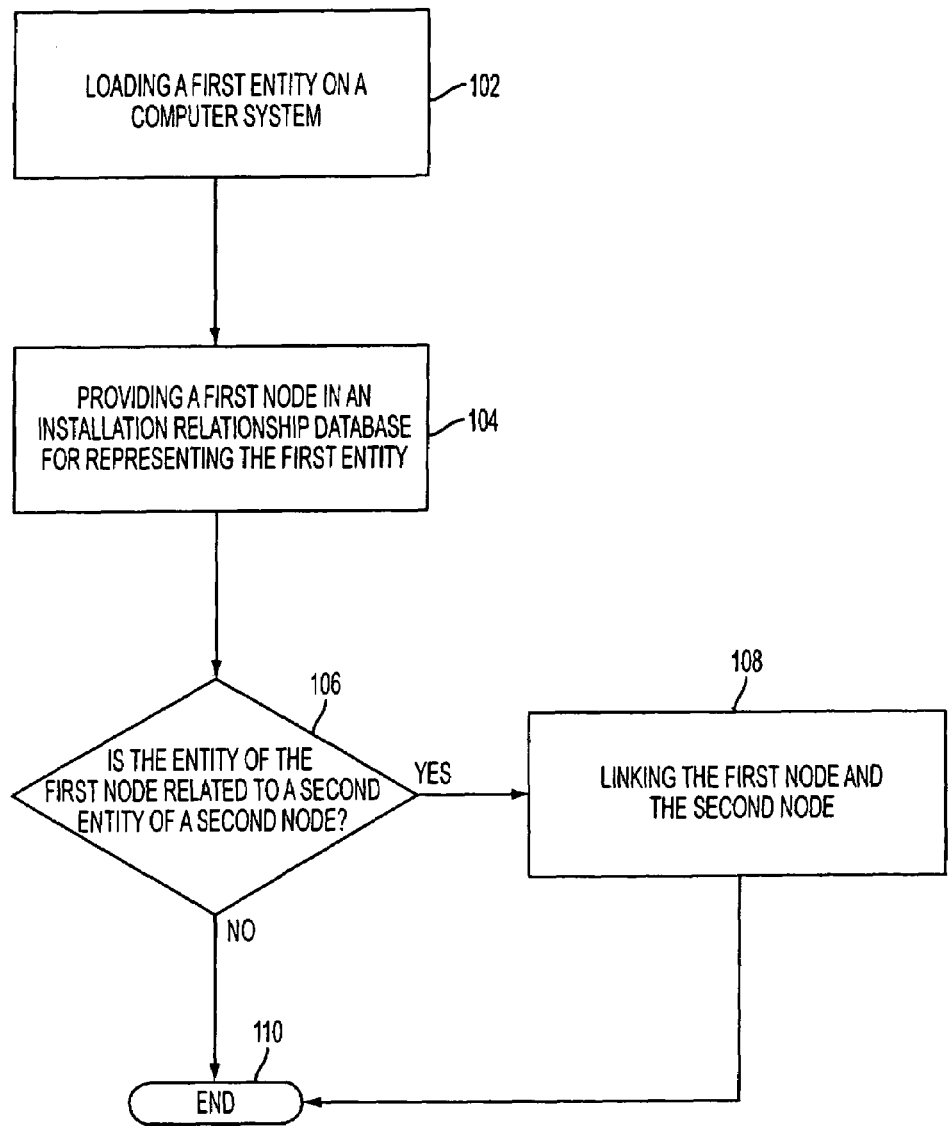
FIG. 1 is a flowchart illustrating one embodiment of the invention.
Figure 2A:
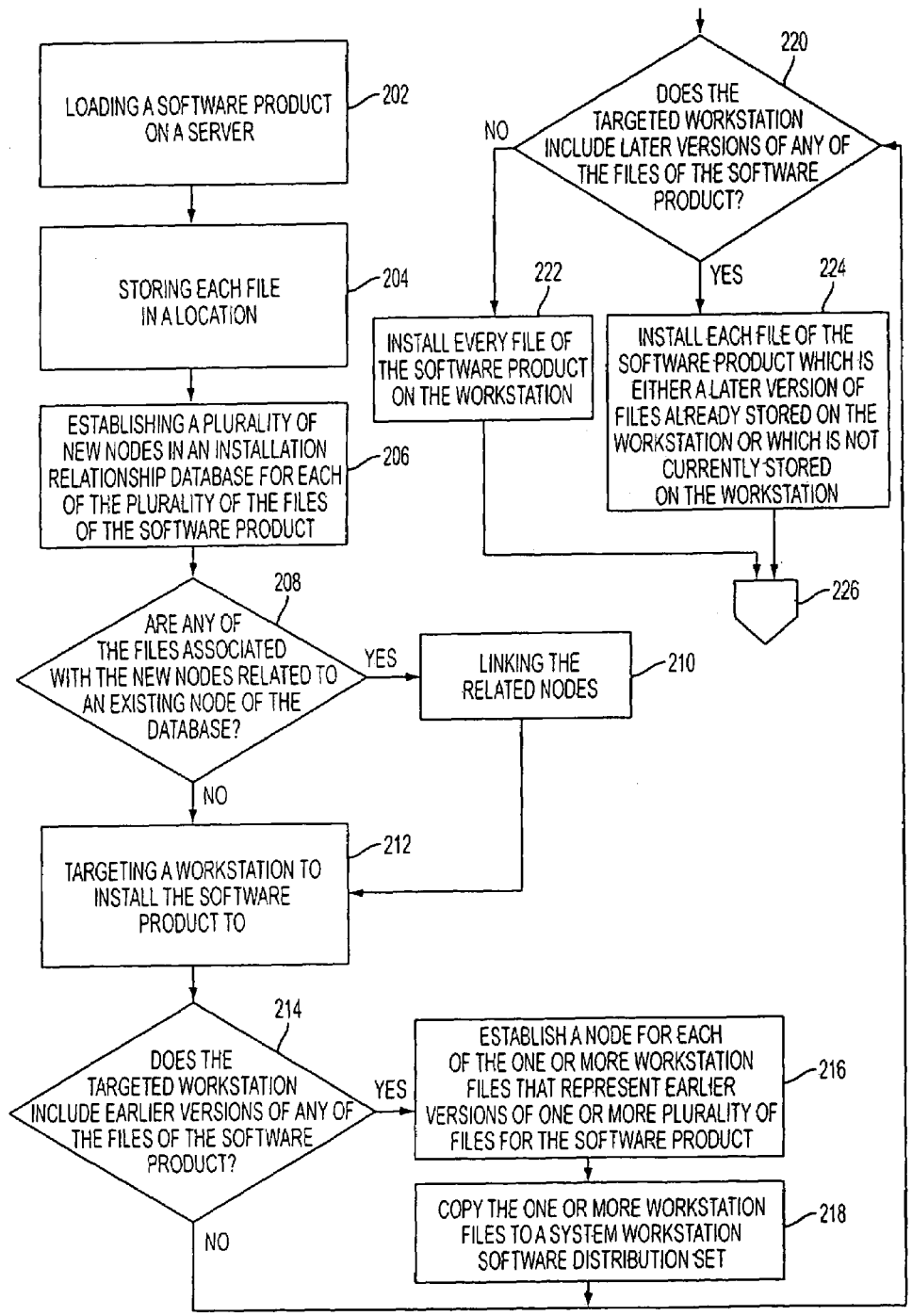
FIG. 2A is a flowchart illustrating a loading and installation of a software product on a workstation of a computer network according to one embodiment of the invention.
Figure 2B:
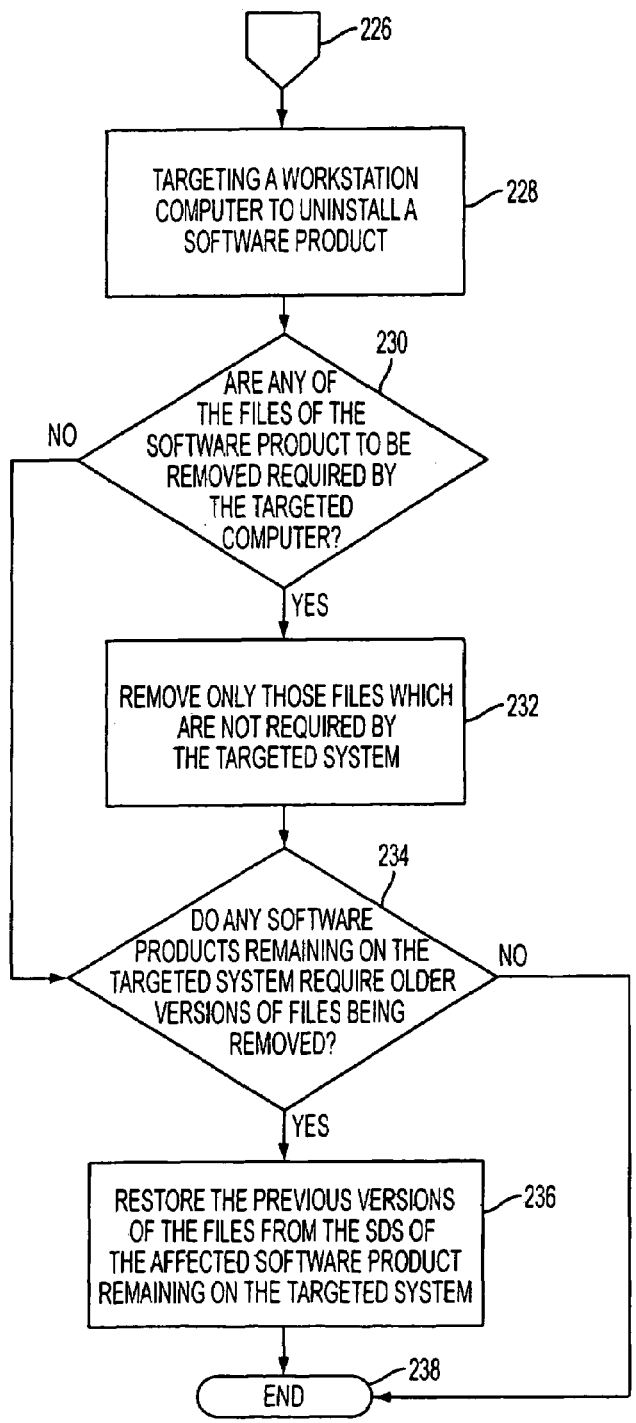
FIG. 2B is a flowchart illustrating an uninstall of a software product from a workstation of a computer network according to one embodiment of the invention.

Embodiments of the invention for creating nodes for entities representing software products and their associated files and SDSs, and installing and un-installing software products from a Target System are illustrated in the flowcharts of FIGS. 1, 2A and 2B. Accordingly, the flowchart of FIG. 1 illustrates a general procedure for loading an entity onto the Versioning System/Database according to the invention.

One or more entities, for example files for a software product, are loaded onto the Versioning System/Database (102). A new node is established in the Versioning Database for each of the files of the software product, and a new node may also be established representing the software product itself (104). The files for the software product are stored in a location on the network (e.g., network server). The Versioning System then determines if any of the files represented by the new nodes relate to any entity (e.g., file, software product) of any existing node on the Versioning Database (106). This may be accomplished by comparing the names and creation dates and/or modification dates of the files of the new nodes to the name and creation date and/or modification date for the existing nodes. A relation, for example, occurs when a file of a new node has the same name as a file of an existing node, but a different creation date (for example). Other relations may be discovered upon entities having the same name, except, for example, a last digit of the name which is a number, or some other alphanumeric which differentiates the entities. When such a relation is discovered, the new node and the discovered existing node are linked (108–110). One of skill in the art will appreciate that related nodes may be linked in an order, including chronological (least recent to most recent) or ascending/descending alphanumeric. Alternatively, the related nodes may be linked in any other fashion which will identify the lineage of related nodes.

FIG. 2A is a flowchart that illustrates the installation of a software product onto a workstation according to one embodiment of the invention. The software product is loaded onto the system according to the process outlined above and illustrated according to FIG. 1 (202–210). The software product and associated files may be stored as an SDS at a location on the network.

A Network Administrator may then target one or more workstations on which to install the software product (212). The targeted workstation may be initially checked to determine whether files stored thereon are earlier versions of any of the files of the software product to be installed (214). This is accomplished by comparing the names and creation dates and/or modification dates (for example) of the files on the Target System to the names and creation dates and/or modification dates of the files of software product. If a relation is discovered, that is, one or more files of the Target System have the same name of one or more files of the software product, but an earlier creation and/or modification date, then a node is established on the Versioning Database for each of the earlier version files and is linked to the related node. These earlier version files are copied to a system SDS (218) so that these files may be re-installed to the Target System if and when the new software product is un-installed from the Target System (for example).

A determination may also be made as to whether the targeted workstation includes one or more files that are later versions of one or more files of the software product (220). Accordingly, this may also be accomplished by comparing the names and dates of the files on the Target System to the files of the software product to be installed. In one embodiment of the invention, the determination of earlier and later versions of files is determined in a single step.

If later versions are discovered (which may be there from installs of other unrelated/related software products), a node for each later discovered version is established on the Versioning Database, and each is linked with the related node of the related file of the software product. In addition, each file of the software product that is either a later version of files currently stored on the workstation or which is not currently stored on the system are installed (224).

However, if the Target System does not include any later versions of the software product files to be installed for the software product, then all the files associated with the software product may be installed on the workstation (222). Thus, after the files for the new software product are installed on the targeted workstation, the software product may now be operated on the Target System.

FIG. 2B is a flowchart which illustrates the process for un-installing a software product from a Target System (226). Initially, a Network Administrator (or perhaps the user of the workstation) targets a particular workstation (Target System) for un-installing a particular software product (228). Prior to removing the files associated with the software product from the Target Workstation, a determination is made as to whether any of the files of the software product being removed will be required by the targeted workstation after the software product is removed (230). This determination is accomplished by examining the Versioning Database to see one or more of the nodes of the Versioning Database representing the files of the software product is linked to a node for another software product or the system software (system SDS). If one or more files of the software product being removed is required by the Target System, the determined file(s) remain on the Target System. Thus, only those files which are not required by the Target System are removed from the Target System (232).

The un-install process also checks the Versioning Database to determine if any software products remaining on the Target System require older versions of files being removed (234). This is accomplished by examining the Versioning Database for nodes of the software products currently installed and determining if any of these nodes represent earlier versions of files being removed from the Target System If so, the previous versions of the one or more files removed during the un-install, which were either previously removed for installing the product currently being un-installed, or were never loaded on the Target System (i.e., remaining software product was installed after the software product which is being removed), are installed to the Target System. In addition, files from the system SDS which were removed due to the original install of the software product that was just un-installed, are installed to the Target System.

FIGS. 4–11 illustrates an exemplary operation of the Versioning System/Database for managing files and software products for a network. In particular, FIGS. 4–11 illustrate various states of the Versioning Database and a Target System as software products are loaded, installed, and uninstalled from a Target System (i.e., workstation). On the left side of each of these figures is a representation of the nodes of the Versioning Database, with the right side representing the Target System for installation of software products. The relationships between nodes of the Versioning Database are represented by arrows that illustrate how different entities are related and by positionings (adjacent nodes) that illustrate different versions of the same entity where nodes corresponding to earlier versions of files are placed to the left of those nodes corresponding to later version of files.

Figure 4:
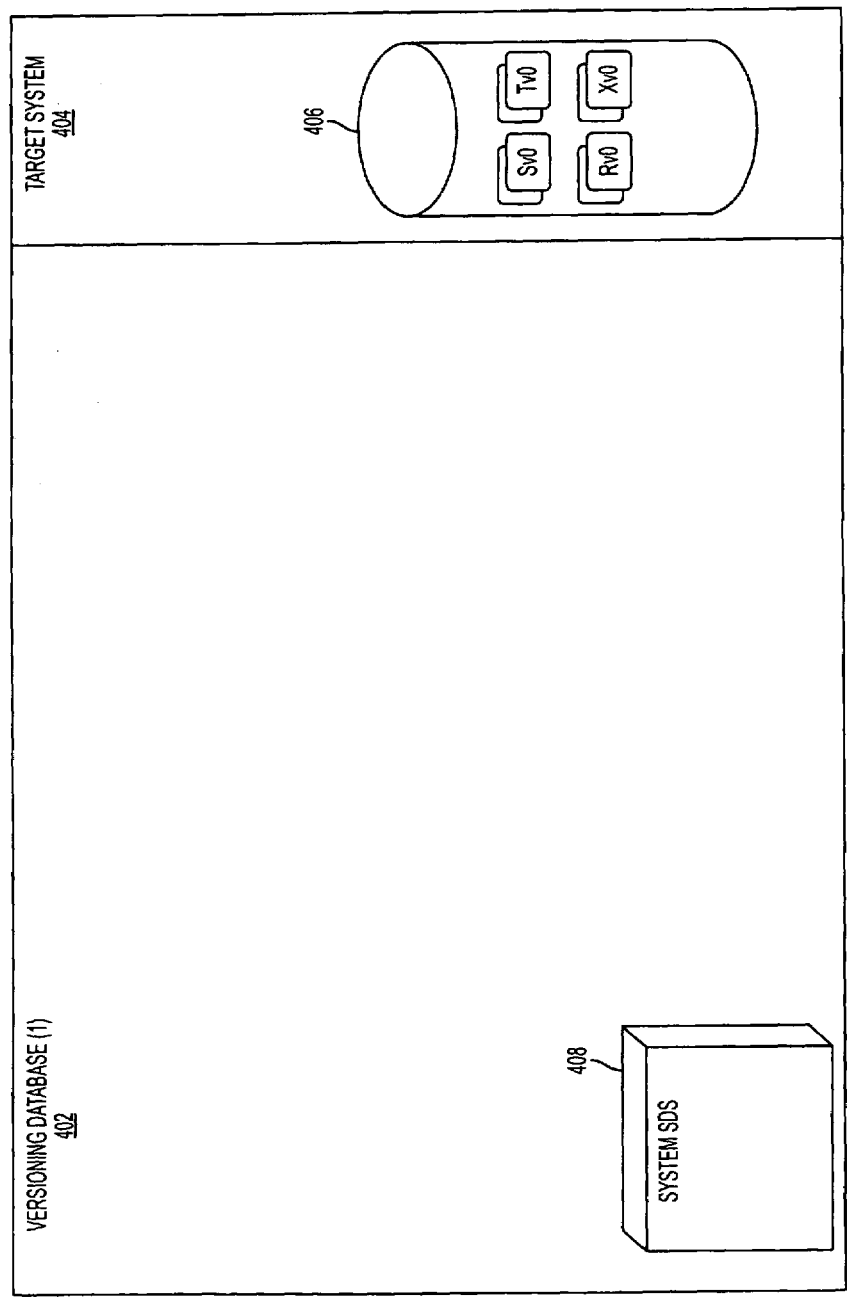
FIGS. 4–11 illustrate an exemplary operation of one embodiment of the invention by illustrating various states of the Versioning Database and a Target System as files are being installed and removed from the Target System.

Accordingly, FIG. 4 represents a state of the Versioning Database and Target System prior to software product being loaded thereon. As shown, an existing Target System 404 includes data storage 406 which includes four files: files S, file T, file R and file X. Each file is an original version of the particular file (Sv0, Tv0, Rv0 and Xv0). A Versioning Database 402 is empty, save for a node 408 which represents an entity identified as a System Software Distribution Set (System SDS). The System SDS node 408 currently does not include a relation to any other entity and does not include references to particular files for the system.

Figure 5:
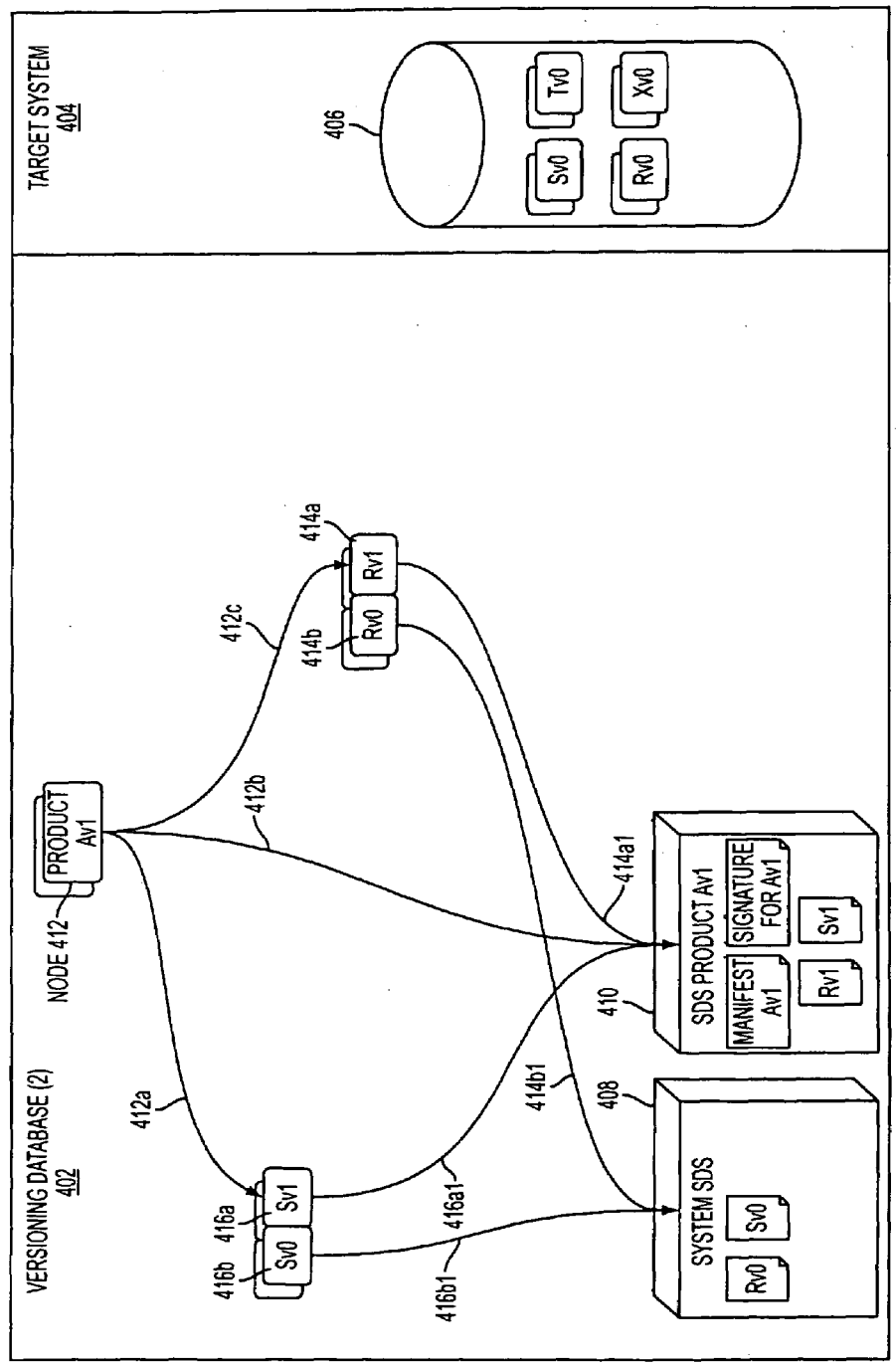

FIG. 5 illustrates a state of the Versioning Database and Target System after a software product A has been loaded on the Versioning Database and prior to the first software product being installed on the Target System. Software product A, which represents version 1 of the product, is loaded on the system and is represented as node 412 in the Versioning Database. Node Av1 is related to nodes Rv1 and Sv1, which represent software product Av1 first version files R and S. A node 416 for the SDS for product Av1 is also established in the Versioning Database 402. The SDS nodes may refer to files for the particular software product (included with an install of the product) or, in the case of a System SDS, files for restoring the original files of a workstation (for example) which were stored thereon prior to an install of a software product which included the same files but newer versions.

A node representing an SDS may also include reference/relation to a Manifest and Signature for the software product. Accordingly, as shown in FIG. 5, node 410 includes references to Manifest Av1 and Signature Av1.

Prior to product Av1 being installed on a workstation (Target System), the Versioning System/Database scans the Target System for files stored thereon which relate to files of the software product Av1. Related files Rv0 and Sv0 are discovered which are earlier versions of files Rv1 and Sv1 of software product Av1. Accordingly, the Versioning System/Database establishes nodes 414b and 416b, which are directly related to nodes 414a and 416b, respectively, since they represent alternate versions of the same file. This direct relation is represented by placing the related nodes immediately adjacent one another. The nodes 414b and 416b also include relation arrows 414b1 and 416b1, respectively, for relating those nodes to the System SDS 408. In addition, nodes 414a and 416a include relation arrows 414a1 and 416a1, which indicate the relation of those nodes to the SDS node 410.

One of skill in the art will appreciate that prior to loading any software product, the Versioning System/Database may catalog all files and software products currently stored on each workstation. Thus, nodes for Rv0, Sv0, Tv0 and Xv0 may be previously established on the Versioning Database (as part of, for example, the System SDS 408).

For each of the file nodes, reference/relation to the location of the entity installed on a workstation is preferably included with the node. Location to an archive location, or a location for obtaining the file to install onto a workstation may also be included with a file node. To that end, a location of an SDS for a software product may also be included with a software product node.

Figure 6:
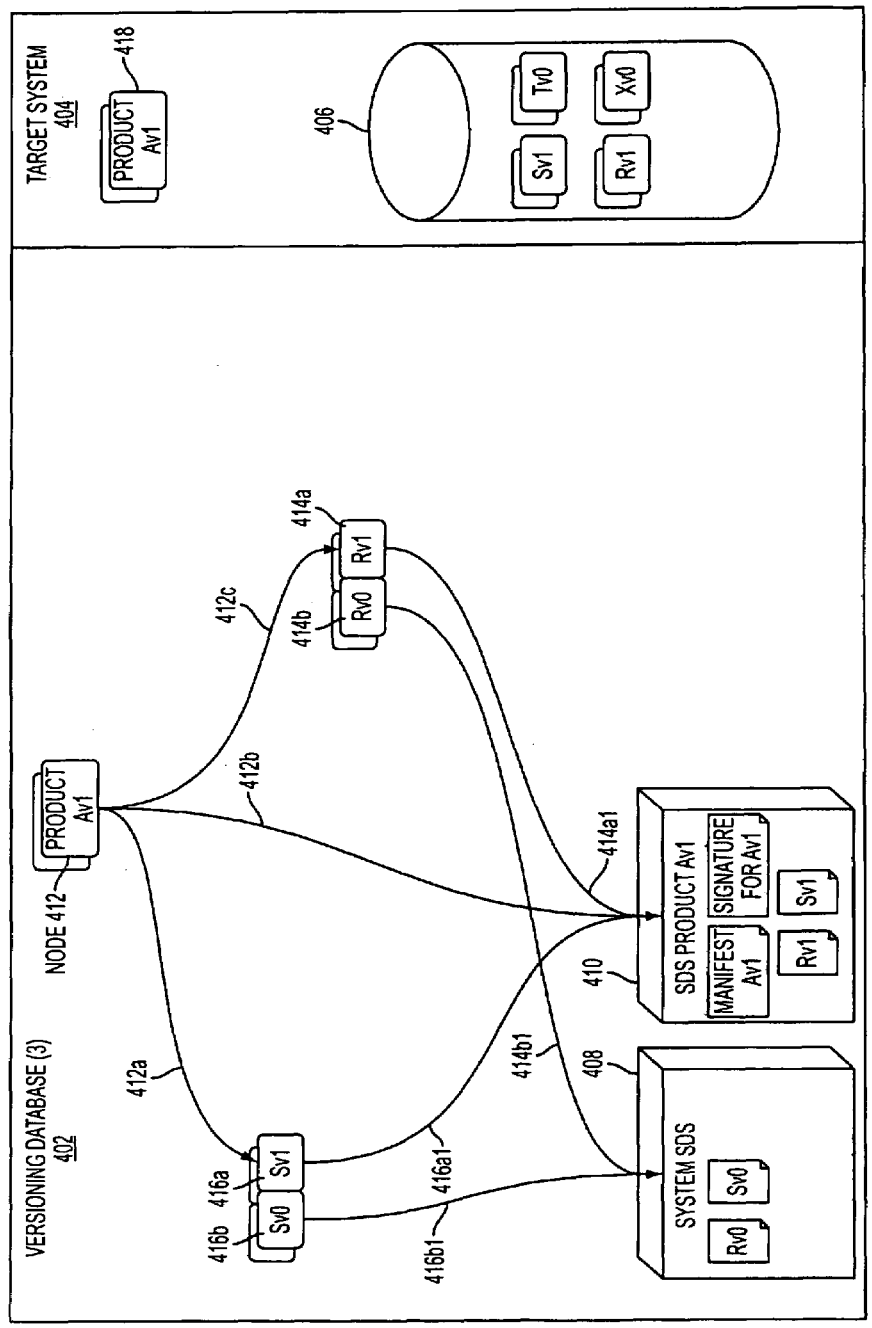

FIG. 6 illustrates a state of the Versioning Database and Target System after the software product Av1 has been installed on the Target System (thereafter represented as installed product 418 on the Target System). Accordingly, files Rv0 and Sv0 are copied to the System SDS, for restoration purposes, and files Rv1 and Sv1 are installed in the data storage 406 of the Target System.

Figure 7:
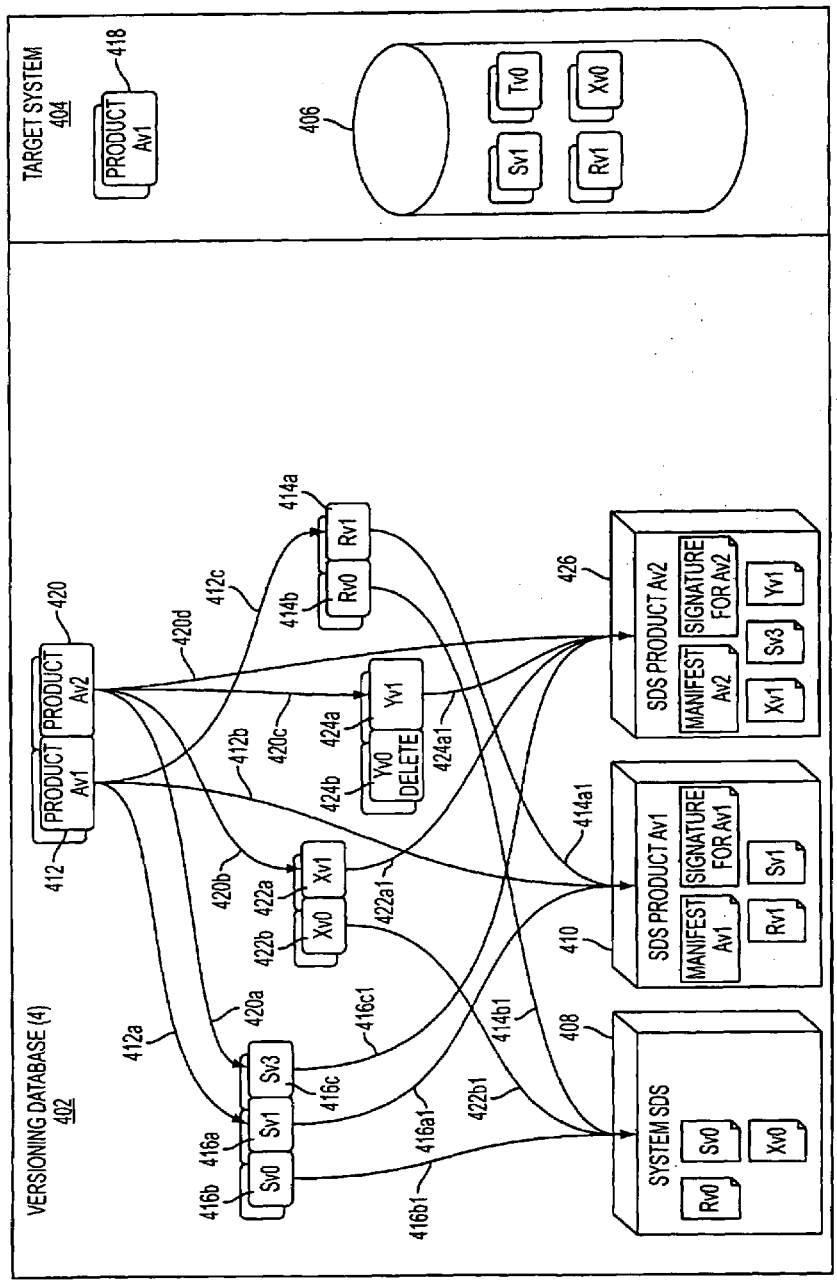

FIG. 7 illustrates a state of the Versioning Database and Target System after a second software product Av2 has been loaded on the Versioning Database and prior to the second software product being installed on the Target System. Node 420 is established for product Av2 and includes a relation arrow 420d which relates that node to node 426 which represents the software distribution set for software product Av2 (which includes references, of course, to files, Xv1, Sv3 and Yv1, and a Manifest and Signature of Av2). Node 420 also includes relation arrows pointing to nodes 422a (arrow 420b), 424a (arrow 420c) and 416c (arrow 420a), which represent files Xv1, Yv1 and Sv3, respectively. Since file Sv3 is directly related (as a later version) to file Sv1, node 416c is placed adjacent node 416a to illustrate this direct relation. Node 420, since it is a later version of product A, is placed immediately adjacent node 412. Nodes 416c, 422a and 424a also include relation arrows 416c1, 422a1 and 424a1, respectively, for indicating the relation of those nodes to the SDS node 426.

Node 424b is also established which is directly related to node 424a (adjacent nodes in FIG. 7). This node does not represent a different version of the file, rather, it is preferably included in the Versioning Database so that upon an uninstall of software product Av2, the file Yv1 will be deleted from the Target System.

When product Av2 is targeted to be installed on the Target System 404, the Versioning System/Database again scans the Target System for files stored thereon which relate to files of the software product Av2 which are not yet apart of the Versioning Database. Accordingly, node 422b is established representing file Xv0, which is directly related to node 422a, the relation illustrated by the placement of node 422b immediately adjacent 422a. File Xv0 is copied/moved to the System SDS 408 for restoration purposes should product Av2 be removed from the Target System. To that end, node 422b includes a relation arrow for illustrating the relationship of node 422b with the System SDS.

Figure 8:
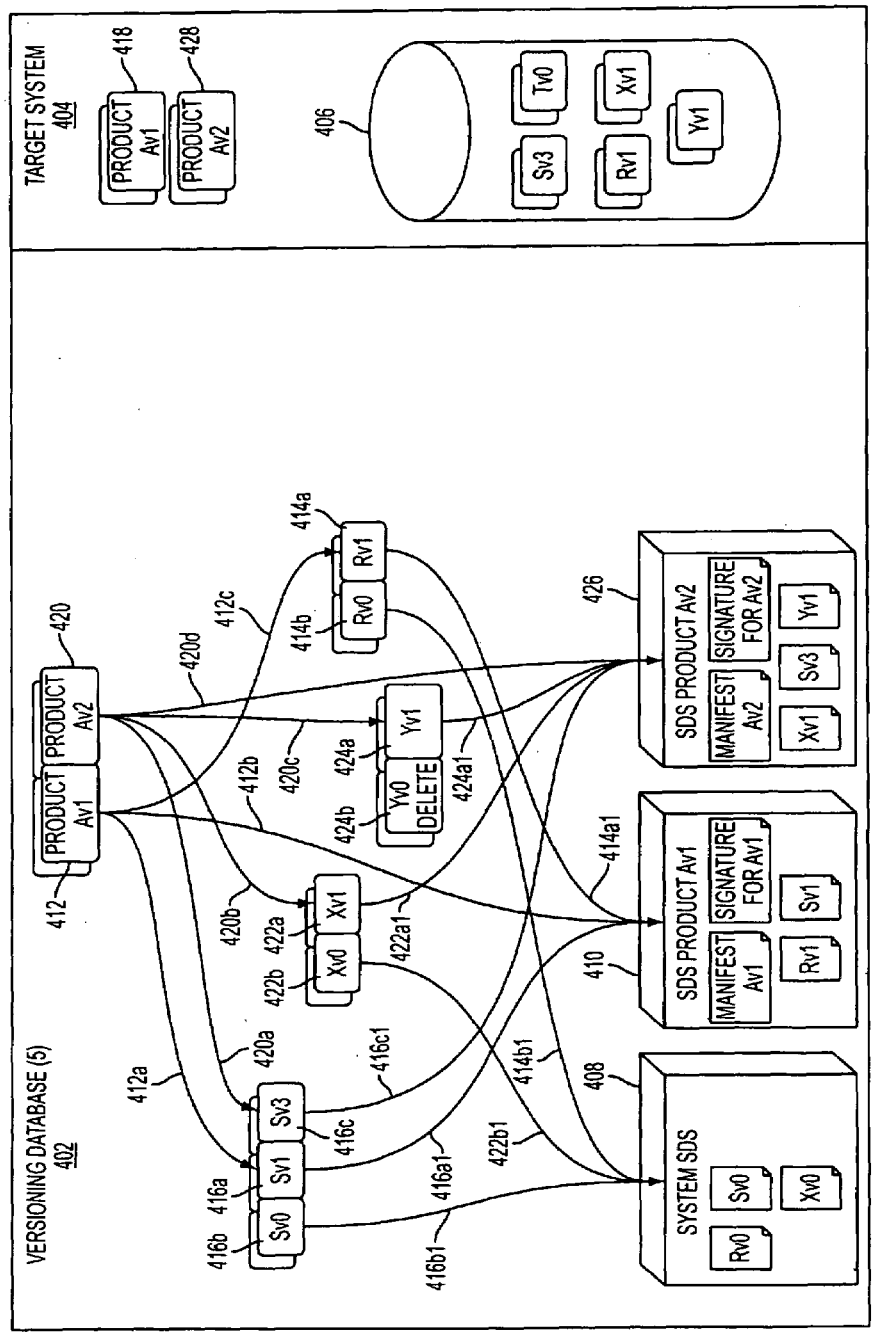

FIG. 8 illustrates a state of the Versioning Database and Target System after product Av2 has been installed on the Target System (represented as installed product 428). Files Sv3, Xv1 and Yv1 are copied to the data storage of the Target System.

Figure 9:
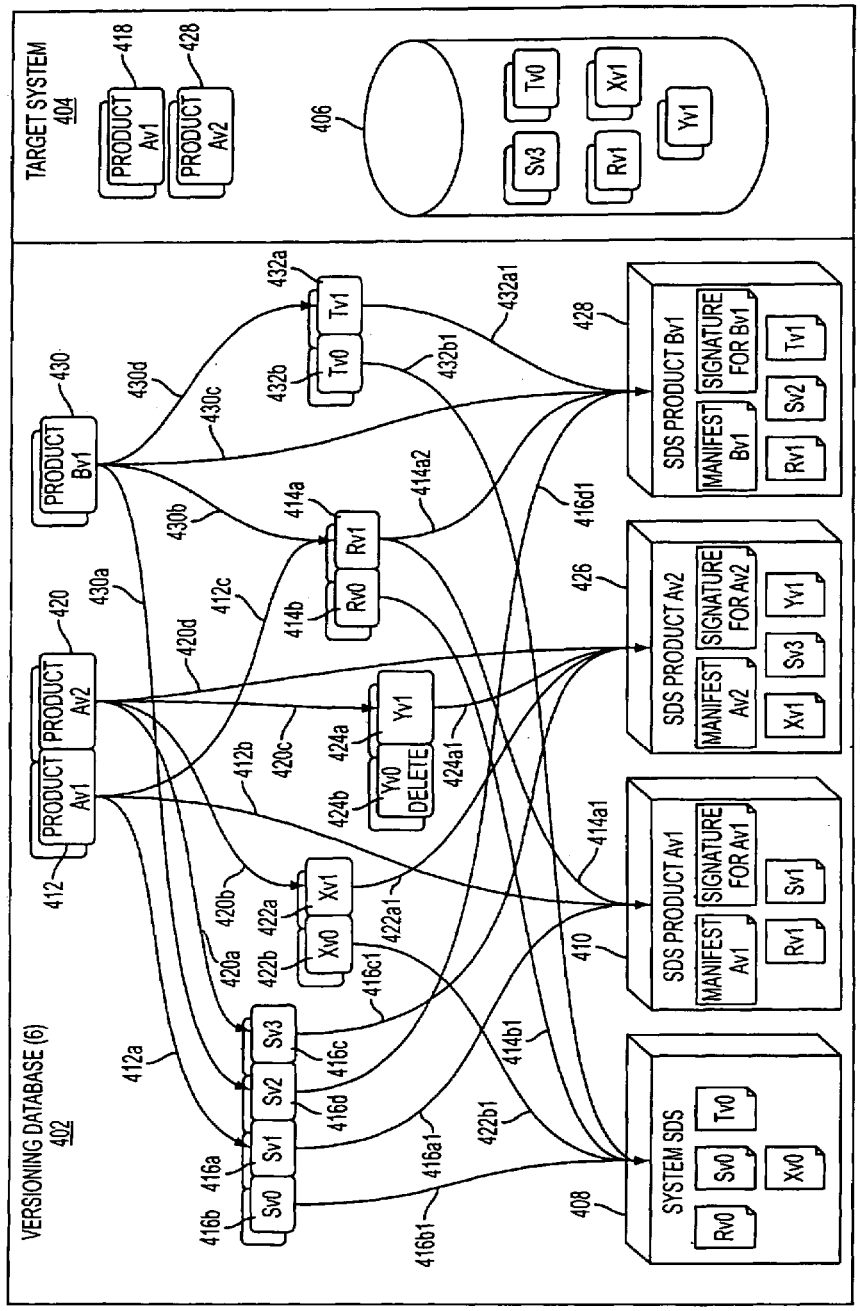

FIG. 9 illustrates a state of the Versioning Database and Target System after a third software product Bv1 has been loaded on the Versioning Database and prior to the third software product being installed on the Target System. Node 430 is established for product Bv1 and includes a relation arrow 430c which relates that node to node 428 which represents the software distribution set for software product Bv1 (which includes references, of course, to files, Rv1, Sv2 and Tv1, and a Manifest and Signature of Bv1). Node 430 also includes relation arrows pointing to nodes 414a (arrow 430 b), 416d (arrow 430a) and 432a (arrow 430d), which represent files Rv1, Sv2 and Tv1, respectively. Nodes 414a, 416d and 432a also include relation arrows 414a1, 416d1 and 432a1, respectively, which indicate the relation of these nodes with the SDS for Bv1. In addition, since file Sv2 is directly related (as a version) to file Sv1 and Sv3, node 416d is placed adjacent node 416a and 416c to illustrate that it represents version 2 of file S that is between versions 1 and 3 to illustrate this direct relation. Accordingly, the direct relation of corresponding versions of files in FIGS. 4–11 are illustrated from left to right as least recent to most recent, respectively.

When product Bv1 is targeted to be installed on the Target System 404, the Versioning System/Database again scans the Target System for files stored thereon which relate to files of the software product Bv1. Accordingly, node 432b is established representing file Tv0, which is directly related to node 432a, the relation illustrated by the placement of node 432b immediately adjacent 432a since file Tv0 is an earlier version of file Tv1. File Tv0 is copied/moved to the System SDS 408 for restoration purposes should product Bv1 be removed from the Target System (i.e., Tv0 is required to be reinstalled). To that end, node 432b includes a relation arrow for illustrating the relationship of node 432b with the System SDS.

Figure 10:
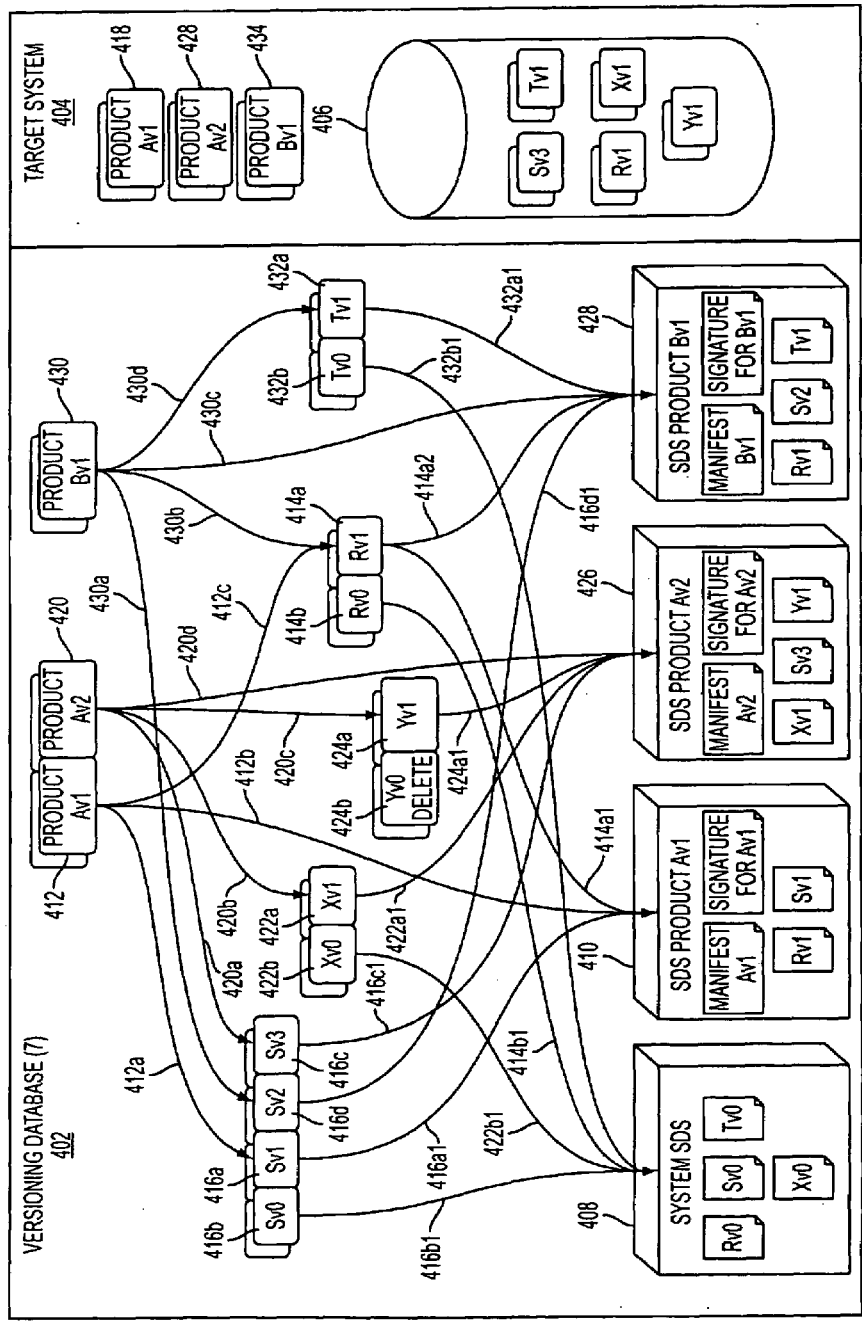

FIG. 10 illustrates a state of the Versioning Database and Target System after the third software product has been installed on the Target System (represented as installed product 434). Only file Tv1 is copied to the data storage 406 of Target System 404. File Rv1 is not copied since it already exists on the Target System. File Sv2 is not copied since a more recent version of this file, Sv3, was copied to the Target System with the install of product Av2. In one embodiment of the invention, however, upon any problems occurring in the operation of Bv1 due to file Sv3, the Versioning System/Database may be used to re-install Sv2 in the Target System (in another location/directory for reference by Bv1) so that Bv1 will operate properly.

Figure 11:
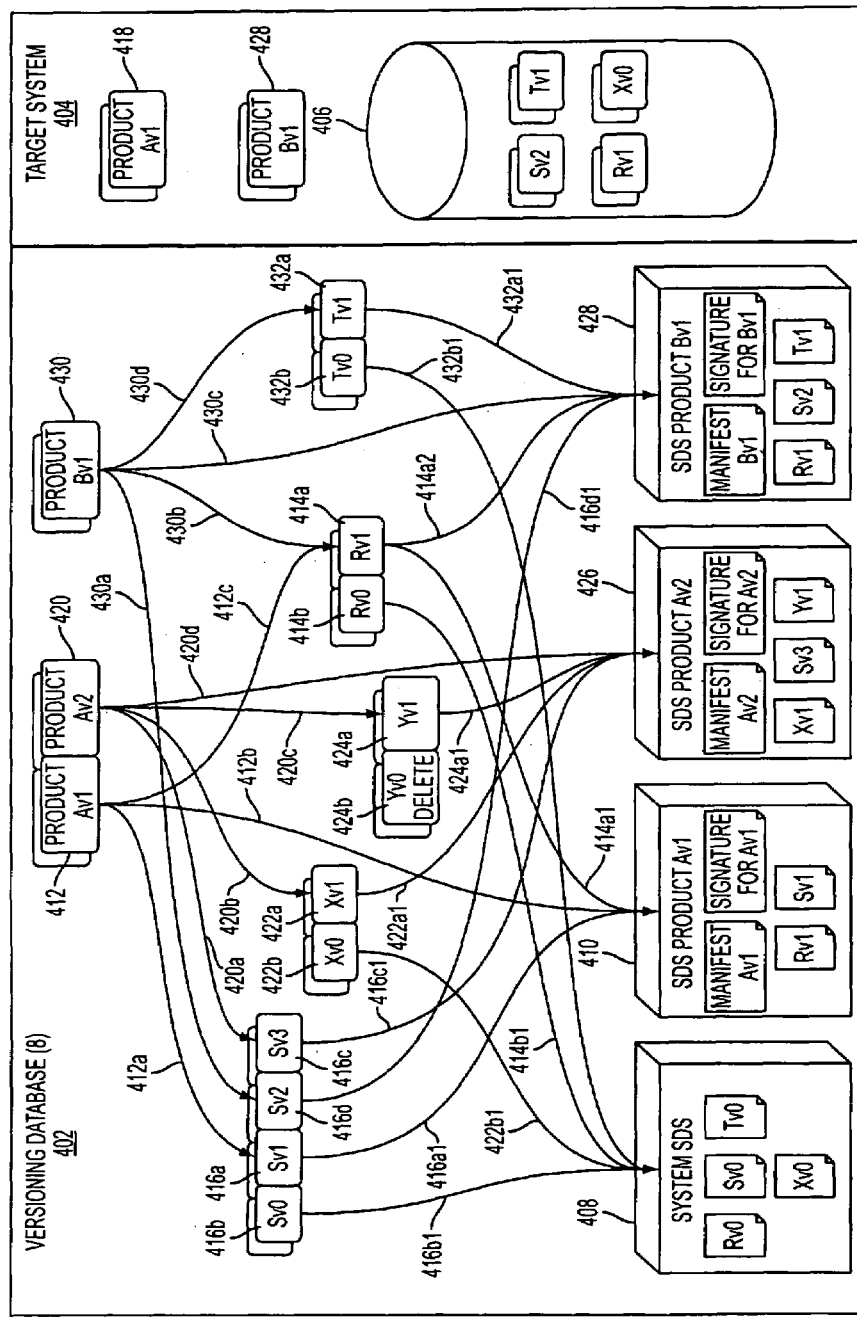

FIG. 11 illustrates a state of the Versioning Database and Target System after the second software product Av2 has been uninstalled from the Target System. Accordingly, when Av2 is uninstalled from the Target System, the files referred to in the SDS of Av2 (426) are targeted for removal by the Versioning System. However, the Versioning System, in view of the relations defined on the Versioning Database, replaces files Xv1 and Sv3 with files Xv0 and Sv2, respectively. File Yv1 is not replaced, but deleted from the Target System since Yv0 does not refer to a file entity (related to Yv1), but rather is there to indicate that Yv1 should be removed from the Target System. Thus, with the removal of Av2 from the Target System, files are replaced/deleted as if Av2 had never been installed on the Target System.

Thus, in view of the above stated embodiments of the invention, the tracking, managing, installation, update, verification and removal of software products may be easily accomplished, especially for the management of software products for a computer network.

Although particular embodiments have been disclosed herein in detail, this has been done by way of example for purposes of illustration only, and is not intended to be limiting with respect to the scope of the appended claims, which follow. In particular, it is contemplated by the inventors that various substitutions, alterations, and modifications may be made to the invention without departing from the spirit and scope of the invention as defined by the claims. Other aspects, advantages, and modifications are considered to be within the scope of the following claims.

What is claimed is:

1. A method for coordinating entities for a computer system to track relationships between files, comprising:
    loading a first entity and a second entity on to a computer system;
    providing a first node and a second node in an installation relationship database for representing the first entity and the second entity, respectively;
    determining a relationship between the first entity of the first node and a second entity of a second node;
    associating the determined relationship between the first entity and the second entity with the first node and the second node; and
    installing the first entity and second entity on a workstation based at least on the determined relationship.

2. The method according to claim 1, wherein the entity is selected from the group consisting of: a file, a group of files, a directory and a software product.

3. The method according to claim 1, wherein determining comprises comparing at least one of a name, a creation date, a modification date, and a version number of the first and the second entities.

4. The method according to claim 1, further comprising linking the first node with the second node in either chronological or version order.

5. The method according to claim 1, further comprising associating a location of an entity, with a respective node, on a workstation of a network.

6. A method for installing a software product on a workstation computer of a computer network to track relationships between files, the network including one or more workstation computers in communication with a server for controlling installation and removal of software products on the network, the method comprising:
- loading a software product on the server, wherein the software product includes a plurality of files associated with a software distribution set for the software product;
- storing each file in a location accessible by the network;
- establishing a plurality of new nodes in an installation relational database corresponding to each of the plurality of files, wherein each new node includes a reference to the stored location of the corresponding file;
- determining a relationship between one or more of the plurality of new nodes and one or more current nodes of the installation relationship database;
- linking the one or more new nodes with a related current nodes of the installation relationship database;
- targeting a first workstation for installing the software product;
- establishing one or more first nodes for one or more first workstation files that are earlier versions of one or more of the plurality of files of the software product;
- copying the one or more workstation files to a system first workstation software distribution set for restoration purposes; and
- installing each file of the plurality of files on the first workstation based at least on the determined relationship between the one or more of the plurality of new nodes and the one or more current nodes wherein the installed files are not currently stored on the first workstation or are later versions of corresponding files currently stored on the first workstation.

7. The method according to claim 6, wherein each related current node includes a reference to the stored location of the file corresponding to the related new node.

8. The method according to claim 6, further comprising establishing a new node for the software product.

9. The method according to claim 6, further comprising establishing a deletion node for one or more new nodes and linking the deletion node to the respective new node.

10. The method according to claim 6, further comprising uninstalling the software product from the first workstation.

11. The method according to claim 10, wherein uninstalling comprises removing the first files from the first workstation and restoring the one or more first workstation files from the first system software distribution set to the first workstation and restoring one or more files of a second software product operation on the first workstation and related to one or more files of the software product.

12. A computer readable medium storing computer instructions thereon for enabling a computer system to perform a method for installing a software product on a workstation computer of a computer network to track relationships between files, the network including one or more workstation computers in communication with a server for controlling installation and removal of software products on the network, the method comprising:
- loading a software product on the server, wherein the software product includes a plurality of files associated with a software distribution set for the software product;
- storing each file in a location accessible by the network;
- establishing a plurality of new nodes in an installation relational database corresponding to each of the plurality of files, wherein each new node includes a reference to the stored location of the corresponding file;
- determining a relationship between one or more of the plurality of new nodes and one or more current nodes of the installation relationship database;
- linking the one or more new nodes with related current nodes of the installation relationship database;
- targeting a first workstation for installing the software product;
- establishing one or more first nodes for one or more first workstation files that are earlier versions of one or more of the plurality of files of the software product;
- copying the one or more workstation files to a system first workstation software distribution set for restoration purposes; and
- installing each file of the plurality of files on the first workstation based at least on the determined relationship between the one or more of the plurality of new nodes and the one or more current nodes, wherein the installed files are not currently stored on the first workstation or are later versions of corresponding files currently stored on the first workstation.

13. An application program for enabling a computer system to perform a method for installing a software product on a workstation computer of a computer network to track relationships between files, the network including one or more workstation computers in communication with a server for controlling installation and removal of software products on the network, the method comprising:
- loading a software product on the server, wherein the software product includes a plurality of files associated with a software distribution set for the software product;
- storing each file in a location accessible by the network;
- establishing a plurality of new nodes in an installation relational database corresponding to each of the plurality of files, wherein each new node includes a reference to the stored location of the corresponding file;
- determining a relationship between one or more of the plurality of new nodes and one or more current nodes of the installation relationship database;
- linking the one or more new nodes with related current nodes of the installation relationship database;
- targeting a first workstation for installing the software product;
- establishing one or more first nodes for one or more first workstation files that are earlier versions of one or more of the plurality of files of the software product;
- copying the one or more workstation files to a system first workstation software distribution set for restoration purposes; and
- installing each file of the plurality of files on the first workstation based at least on the determined relationship between the one or more of the plurality of new nodes and the one or more current nodes, wherein the installed files are not currently stored on the first workstation or are later versions of corresponding files currently stored on the first workstation.

14. A system computer software enable for installing a software product on a workstation computer of a computer network to track relationships between files, the network including one or more workstation computers in communication with a server for controlling installation and removal of software products on the network, the system comprising:
   loading means for loading a software product on the server, wherein the software product includes a plurality of files associated with a software distribution set for the software product;
   storing means for storing each file in a location accessible by the network;
   establishing means for establishing a plurality of new nodes in an installation relational database corresponding to each of the plurality of files, wherein each new node includes a reference to the stored location of the corresponding file;
   determining means for determining a relationship between one or more of the plurality of new nodes and one or more current nodes of the installation relationship database;
   linking means for linking the one or more new nodes with related current nodes of the installation relationship database;
   targeting means for targeting a first workstation for installing the software product;
   establishing means for establishing one or more first nodes for one or more first workstation files that are earlier versions of one or more of the plurality of files of the software product;
   copying means for copying the one or more workstation files to a system first workstation software distribution set for restoration purposes; and
   installing means for installing each file of the plurality of files on the first workstation based at least on the determined relationship between the one or more of the plurality of new nodes and the one or more current nodes, wherein the installed files are not currently stored on the first workstation or are later versions of corresponding files currently stored on the first workstation.

15. A computer readable medium storing computer instructions thereon for allowing a computer system to perform a method for coordinating entities for a computer system to track relationships between files, the method comprising:
   loading a first entity and a second entity on to a computer system;
   providing a first node and a second node in an installation relationship database for representing a first entity and a second entity, respectively;
   determining a relationship between the first entity of the first node and a second entity of a second node;
   associating the determined relationship between the first entity and the second entity with the first node and the second node; and
   installing the first entity and second entity on a workstation based at least on the relationship.

16. A computer application program for allowing a computer system to perform a method for coordinating entities for a computer system to track relationships between files, the method comprising:
   loading a first entity and an second entity on to a computer system;
   providing a first node and a second node in an installation relationship database for representing a first entity and the second entity, respectively;
   determining a relationship between the entity of the first node and a second entity of a second node;
   associating the determined relationship between the first entity and the second entity with the first node and the second node; and
   installing the first entity and second entity on a workstation based at least on the determined relationship.

17. A system computer software enabled computer for coordinating entities for a computer system to track relationships between files, the system comprising:
   loading means for loading a first entity and a second entity on to a computer system;
   providing means for providing a first node and a second node in an installation relationship database for representing the first entity and the second entity, respectively;
   determining means for determining a relationship between the first entity of the first node and a second entity of a second node;
   associating means for associating the determined relationship between the first entity and the second entity with the first node and the second node; and
   installing the first entity and second entity on a workstation based at least on the determined relationship.

18. A computer software enabled computer system for tracking relationships between files comprising:
   a versioning database comprising a plurality of nodes each corresponding to an entity, wherein related nodes are relationally linked;
   a software distribution set for a software product, the software distribution set including one or more files for operating the software product, wherein the versioning database includes a node corresponding to the software product relationally linked to each node for each of the files for operating the software product, and wherein the nodes for the files for operating the software product are relationally linked to nodes corresponding to other versions of such files; and
   an installer application for installing and removing software products wherein upon installing a software product the application determines the related files to be installed by using the versioning database.

19. The system according to claim 18, further comprising at least one workstation for installing a software product thereon.

20. The system according to claim 18, further comprising a server, wherein the server and the at least one workstation communicate via network.

* * * * *